United States Patent [19]

Bowerman

[11] 3,815,825
[45] June 11, 1974

[54] BEARING PROTECTOR FOR FLUENT MATERIAL DISTRIBUTORS

[75] Inventor: Paul Lee Bowerman, Silver Lake, Ind.

[73] Assignee: The Cyclone Seeder Company, Inc., Urbana, Ind.

[22] Filed: May 1, 1972

[21] Appl. No.: 249,388

[52] U.S. Cl.............. 239/683, 239/142, 308/36.4
[51] Int. Cl..................... A01c 17/00, F16c 33/74
[58] Field of Search ........... 239/681, 686, 683, 684, 239/685, 686, 687, 688, 142; 308/36.4

[56] References Cited
UNITED STATES PATENTS

| 1,269,405 | 6/1918 | Dilg | 308/36.4 |
| 2,980,407 | 4/1961 | Luscombe | 308/36.4 X |
| 3,315,823 | 4/1967 | Rikoff | 239/687 X |
| 3,394,892 | 7/1968 | Speicher | 239/683 |
| 3,425,636 | 2/1969 | Dreyer et al. | 239/687 X |
| 3,615,055 | 10/1971 | Van der Lely | 239/687 X |

Primary Examiner—Lloyd L. King
Assistant Examiner—Andres Kashnikow
Attorney, Agent, or Firm—Oltsch & Knoblock

[57] ABSTRACT

A protector for use in conjunction with a distributor for seed, plant and other fluent type material. The distributor includes a container for the fluent material and has a bottom portion having an opening therein. A shaft is connected to a rotatable material impeller and protrudes upwardly through the opening in the container bottom portion where the protector which is plate shaped is connected to the shaft adjacently above the opening. The plate rotates with the impeller shaft and causes the material within the container and coming into contact with the plate to be thrown laterally outwardly from the shaft and away from the opening in the container bottom portion.

2 Claims, 4 Drawing Figures

BEARING PROTECTOR FOR FLUENT MATERIAL DISTRIBUTORS

SUMMARY OF THE INVENTION

This invention pertains to a device for preventing undue wear between moving parts and has specific but not limited application to a protector for a bearing used in a spreader or other type of distributor for fluent material.

Spreaders of the broadcast type which are utilized to distribute seed, fertilizer, lime and other similar fluent material are constructed so as to include a container for the fluent material. The container has a bottom wall below which an impeller for distributing the material is positioned. The impeller includes a shaft which protrudes upwardly through an opening in the bottom wall of the container. Usually a bearing is carried by the container bottom wall and journals the impeller shaft which extends through the opening therein. A second opening is formed in the container bottom wall through which the fluent material passes to fall onto the impeller, which upon rotation causes the material to be flung outwardly in a prescribed pattern as the spreader is moved over the ground. During use of the spreader, minute portions of the fluent material have a tendency to work between the bearing and the shaft of the impeller causing the bearing to experience accelerated wear. In this invention, a protector which is a plate having a disk-shaped configuration is mounted to the impeller shaft and is positioned adjacently above the bearing for the shaft. The protector is secured for rotation with the shaft and serves to substantially prevent the fluent material from falling or being drawn between the bearing and the shaft, thus materially increasing the life of the bearing.

Accordingly, it is an object of this invention to provide a protector for use in conjunction with fluent material distributor means which increases the life of the distributor bearings which are exposed to the fluent material.

Another object of this invention is to provide a protector for the bearing means between the container for the fluent material and the shaft of an impeller utilized in a broadcast spreader.

Another object of this invention is to provide an economical means for prolonging the useful life of bearings utilized in fluent material distributors.

Other objects of this invention will become apparent upon a reading of the invention's description.

DESCRIPTION OF THE PREFERRED EMBODIMENTS

The preferred embodiments illustrated are not intended to be exhaustive or to limit the invention to the precise forms disclosed. They are chosen and described in order to best explain the principles of the invention and its application and practical use to thereby enable others skilled in the art to best utilize the invention.

Figure 1:
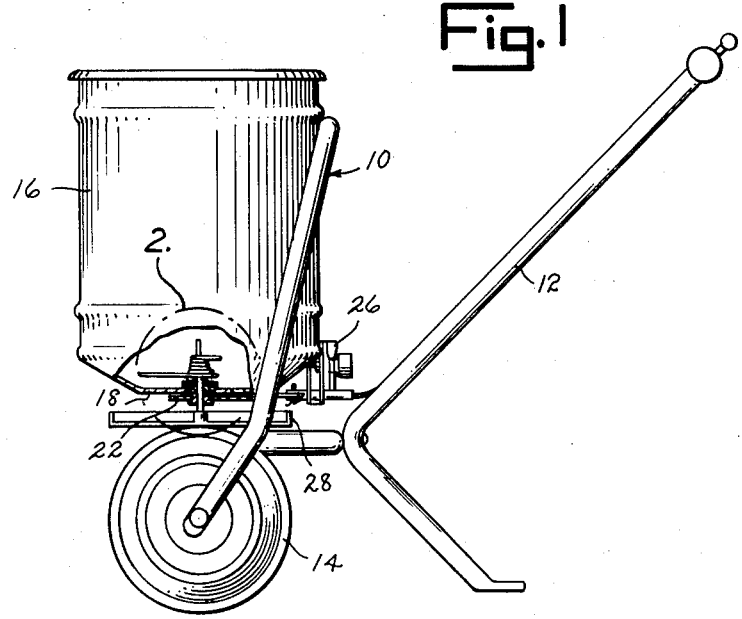
FIG. 1 is a side elevational view of a spreader having portions of the fluent material container thereof broken away for purposes of illustration.

The spreader in FIG. 1 is of the braodcast type and includes a frame 10 which carries a handle 12 and which is supported by a wheel assembly 14. A container 16 having a bottom wall 18 is secured to frame 10. A discharge opening 20 is formed in bottom wall 18 of container 16. A shiftable plate 22 having an opening 24 therein is located beneath container 16 and positioned against its bottom wall 18. A flow adjustment assembly 26 is operatively connected to plate 22 and, upon actuation, causes plate 22 to shift relative to container 16 to bring plate opening 24 into registry with discharge opening 20 in bottom wall 18. This permits the fluent material within the container to flow through bottom wall 18 and onto an impeller 28. Impeller 28 is located below container 16 and includes a shaft 30 which extends through an opening 32 in container bottom wall 18. Shaft 30 is operatively coupled to wheel assembly 14 so that rotation of the wheel assembly will cause the rotation of impeller 28 and the resulting radial distribution of the fluent material as it falls through opening 20 in bottom wall 18 of the container. The material spreader thus far described is of a standard construction whose method of operation is well known in the art. Such construction of a spreader or similar variations thereof can be found in U.S. Pat Nos. 3,394,892; 2,882,060; and 2,843,387.

Figure 2:
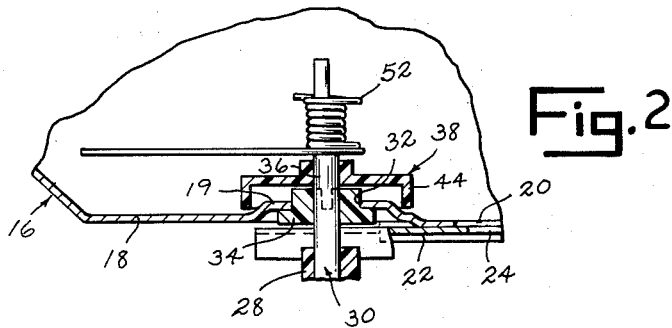
FIG. 2 is an enlarged detailed sectional view of the encircled portion of the material spreader of FIG. 1.
Figure 3:
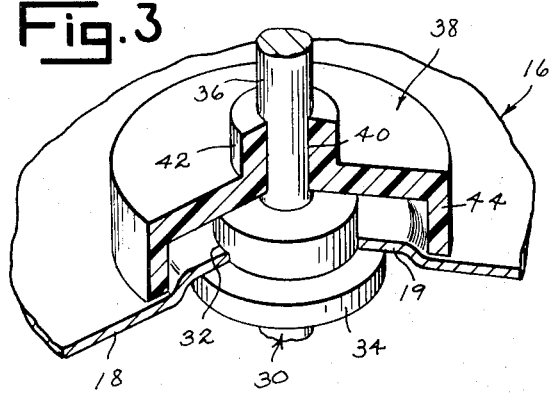
FIG. 3 is a perspective view in partial section of the embodiment of this invention shown in FIG. 2.

In most constructions of spreaders of the type above described, it is customary to journal the upper end portion 36 of impeller shaft 30 in a suitable bearing, generally constructed of a low frictional material such as nylon. Such a bearing, designated in the drawings by the reference numeral 34, is fitted into opening 32 in container bottom wall 18. Bearing 34 may be secured to bottom wall 18 by a press or snap type fit or other suitable means. The upper end portion 36 of impeller shaft 30 extends through bearing 34 and projects into container 16. One embodiment of the protector of this invention is illustrated in detail in FIGS. 2 and 3 and comprises a plate 38 having an annular configuration with a central opening 40 therein. If desired, plate 38 may include an annular neck portion 42 coaxially located relative to opening 40 therein. End portion 36 of impeller shaft 30 extends through opening 40 in plate 38 with the plate being secured to shaft 30, either by a press fit or other suitable means. Plate 38 is positioned with its lower face preferably just slightly spaced from bearing 34 and extends laterally outwardly from shaft 30 beyond the circumferential edge of opening 32 in bottom wall 18 of container 16. In the illustrated spreader, bearing 34 and a part 19 of bottom wall 18 of container 16 protrude upwardly. A downturned continuous annular flange 44 is formed at the outer edge of plate 38. Flange 44 extends downwardly where in terminates preferably just slightly above the upper surface of bottom wall 18 but below protruding part 19 of the container.

During rotation of impeller 28, the fluent material within container 16 in contacting the upper surface of plate 38 is thrown radially outwardly away from shaft 30 and bearing 34 with flange 44 serving to assure that little, if any, fluent material finds its way between plate 38 and container bottom wall 18 and into bearing 34. It has been found that the use of plate 38 will increase the useful life of the bearing ten fold.

Figure 4:
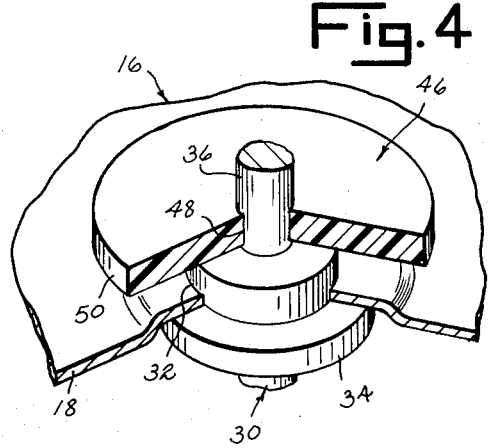
FIG. 4 is a perspective view in partial section of a modified embodiment of this invention.

The embodiment of the protector of this invention shown in FIG. 4 is a plate 46 having an annular configuration with a central opening 48 therein. End portion 36 of impeller shaft 30 protrudes through opening 48 in plate 46 with the plate being secured to the shaft either by a press fit or other type of securement means. The outer marginal edge 50 of plate 46 protrudes beyond opening 32 in bottom wall 18 of container 16 and the plate is positioned with its lower face preferably just slightly spaced above bearing 34. When plate 46 and impeller shaft 30 are rotated during operation of the spreader, plate 46 serves to deflect and urge the fluent material, when contacting the plate, outwardly and away from bearing 34 and opening 32 in the bottom wall of the container.

Plates 46 and 38 serve to prevent the accumulation of fluent matter about the exposed portion of bearing 34 within container 16 during the period of time the spreader is not in use. Additionally, both plate 38 and plate 46 may be formed from a material having a low coefficient of friction, such as nylon, so as to allow for unrestricted relative movement between the plates and container bottom wall 18 should contact be made between the plates and the wall.

A stirrer or agitator 52 may be secured to end portion 36 of impeller shaft 30 where it protrudes above plate 38. Agitator 52 is utilized to prevent caking of the fluent material around and above discharge opening 20 in container 16 and may be of a variety of constructions, one of which is described in U.S. Pat. No. 3,175,739.

It is to be understood that the invention is not to be limited to the details herein given, but may be modified within the scope of the appended claims.

What I claim is:

1. A protector for use in conjunction with means usable for spreading seed, plant or other fluent material, said spreading means including a container for said material, said container having a bottom portion, said bottom portion having an opening therein, an impeller means for distributing said material located under said container opening and carried upon a substantially vertically oriented shaft, said shaft extending upwardly through said container opening and into said container, a bearing carried by said container bottom portion at said opening therein and journaling said shaft in said container opening, said protector comprising a disk shaped plate means having a central opening therein and including an annular downturned flange depending from the outer edge of said plate means, said plate means located within said container adjacently over said container opening with said shaft protruding upwardly through said plate opening, means securing said plate means to said shaft for rotation with the shaft wherein said plate means serves to deflect said material coming in contact therewith laterally outwardly of said shaft and away from said container opening.

2. The protector of claim 1 wherein said container bottom portion includes a part which protrudes upwardly into said container and which defines the margin of said container opening, said flange of the plate means having a lower edge terminating below the upper edge of said container protruding part.

* * * * *